(12) United States Patent
Reichel et al.

(10) Patent No.: US 7,881,370 B2
(45) Date of Patent: Feb. 1, 2011

(54) METHOD OF SELECTING AMONG N SPATIAL VIDEO CODECS THE OPTIMUM CODEC FOR A SAME INPUT SIGNAL

(75) Inventors: Julien Reichel, Renens (CH); Francesco Ziliani, Lausanne (CH)

(73) Assignee: Visiowave S.A., Ecublens (CH)

( * ) Notice: Subject to any disclaimer, the term of this patent is extended or adjusted under 35 U.S.C. 154(b) by 1314 days.

(21) Appl. No.: 10/539,207

(22) PCT Filed: Dec. 9, 2003

(86) PCT No.: PCT/IB03/05852
§ 371 (c)(1),
(2), (4) Date: Mar. 29, 2006

(87) PCT Pub. No.: WO2004/056124
PCT Pub. Date: Jul. 1, 2004

(65) Prior Publication Data
US 2006/0215751 A1 Sep. 28, 2006

(30) Foreign Application Priority Data
Dec. 17, 2002 (EP) .................................. 02406109

(51) Int. Cl.
*H04N 7/12* (2006.01)
*H04N 11/02* (2006.01)
*H04N 11/04* (2006.01)

(52) U.S. Cl. .................... 375/240.03; 375/240.01; 375/240.18; 375/240.19; 375/240.2

(58) Field of Classification Search ............ 375/240.01, 375/240.03, 240.18–240.2
See application file for complete search history.

(56) References Cited

U.S. PATENT DOCUMENTS 5,047,852 A * 9/1991 Hanyu et al. ............. 375/240.2

(Continued)

FOREIGN PATENT DOCUMENTS

| EP | 0 866 426 | 9/1998 |
|---|---|---|
| WO | 97/15146 | 4/1997 |
| WO | 98 38800 | 9/1998 |

OTHER PUBLICATIONS

Chandra S. et al., JPEG compression metric as a quality aware image transcoding $2^{nd}$ USENIX Symposium on Internet Technologies And Systems, Proceeding of USENIX' 99: $2^{nd}$ Symposium on Internet Technologies and Systems, Boulder, CO, USA, Oct. 11-14, 1999, pp. 81-92.

(Continued)

*Primary Examiner*—Marsha D Banks Harold
*Assistant Examiner*—Chikaodili E Anyikire
(74) *Attorney, Agent, or Firm*—Armstrong Teasdale LLP

(57) ABSTRACT

The invention relates to a method of selecting among N "Spatial Video CODECs" where N is an integer number greater than 1, the optimum "Spatial Video CODEC" for a same input signal I. "Spatial Video CODEC" is understood as the combination of any transform of the input signal, followed by a quantization of the transform coefficients and a corresponding entropic coder. Firstly from all the N "Spatial Video CODECs" for the same input signal I and a same quality parameter Q, the rate R and the distortion measures D are obtained. Q is an integer value between 0 and 100, defined by any rate-distortion algorithm to provide a compression of the input sequence with constant rate or with constant distortion. Further an optimality criterion is calculated. The optimality criterion is defined as the minimization of the value $L_n=f(R_n, D_n)$ calculated for all the n from 1 to N. n is the index of the "Spatial Video CODEC", where $f(R_n, D_n)$ is a function of $R_n$ and $D_n$. The function f may be defined as as $f(R_n,D_n)=R_n+1 D_n$, , 1 being the Lagrange multiplier that weights the relative influence of the rate R and of the distortion D.

7 Claims, 5 Drawing Sheets

U.S. PATENT DOCUMENTS 5,394,473 A * 2/1995 Davidson ................. 704/200.1
5,778,192 A    7/1998 Schuster et al.
5,959,560 A * 9/1999 Said et al. ................... 341/107

OTHER PUBLICATIONS

Mallat S. et al., "Analysis of Low Bit Rate Image Transform Coding", IEEE Transactions on Signal Processing, IEEE, Inc., New York, US, vol. 46, No. 4, Apr. 1, 1998, pp. 1027-1042.

* cited by examiner

Fig.3
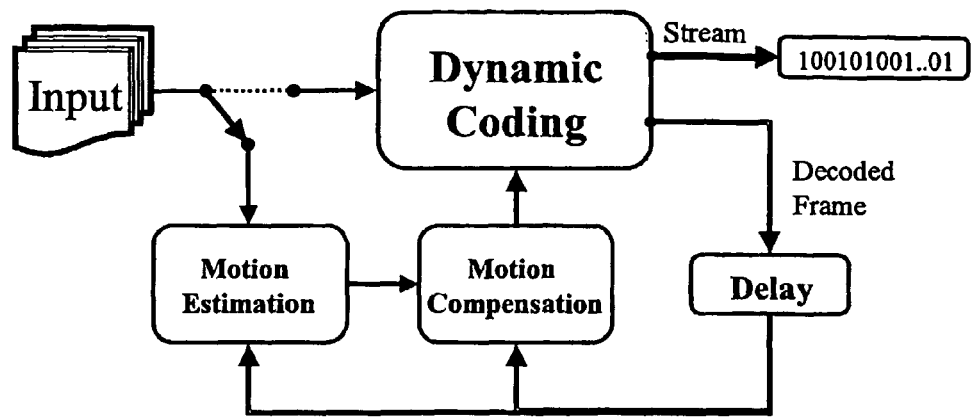
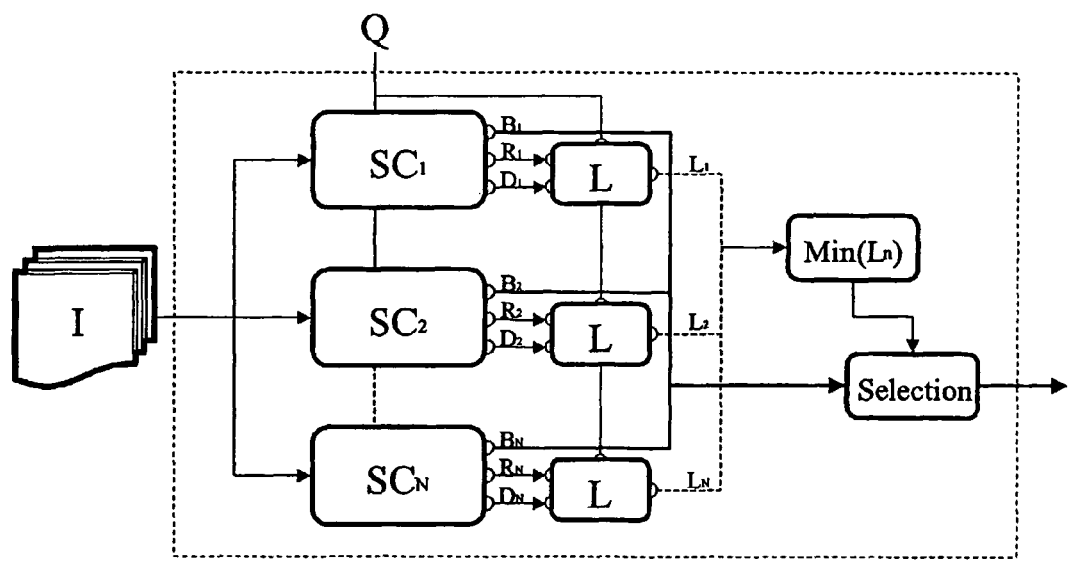
Fig.4

Fig.7
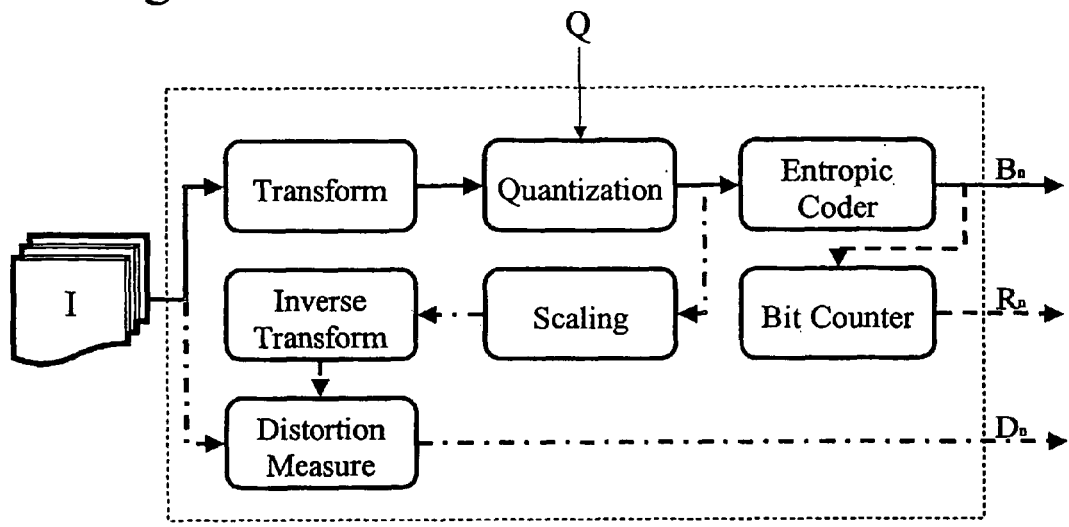
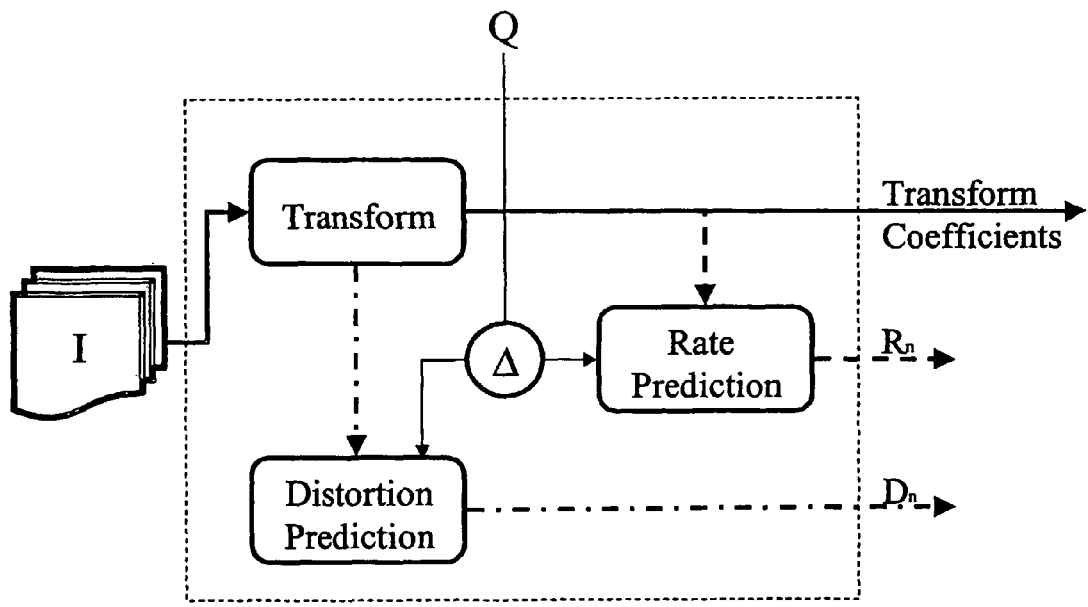
Fig.8

Fig.9
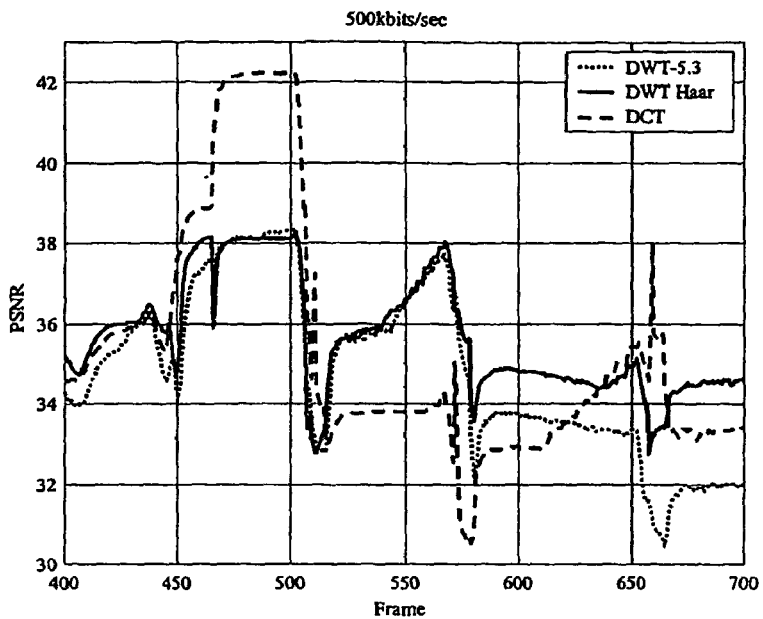
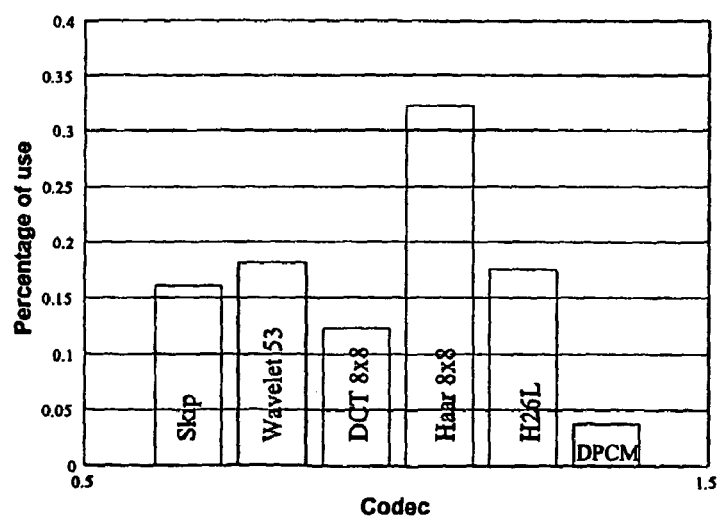
Fig.10

METHOD OF SELECTING AMONG N SPATIAL VIDEO CODECS THE OPTIMUM CODEC FOR A SAME INPUT SIGNAL

This disclosure is based upon European Application No. 02406109.5 filed Dec. 17, 2002, and International Application No. PCT/IB2003/005852, filed Dec. 9, 2003, the contents of which are incorporated by reference.

BACKGROUND OF THE INVENTION

The present invention relates to a method of selecting among N "Spatial Video CODECs" where N is an integer to off-line), the minimum acceptable quality (spatial and temporal resolution), the type of communication (point to point, broadcast, multi-point to point, etc . . . ), and the set of functionalities required (scalability, progressiveness, etc.). Often these parameters such as the nature of the input signal or the available bandwidth may change in time with a consequent variation of the performances of the selected "Spatial Video CODEC". In the following table, major specifications for a few of the most critical applications for video coding are listed. Reads "Mbps" Mega bit per second, "Kbps" kilobit per second, "fps" frame per second, "MP2MP" multi point to multi point, "P2P" point to point, "P2MP" point to multipoint

| | Type of data | Nature of data | Target bitrate | Max delay | Minimum quality | Type of comm. | Functionalities |
|---|---|---|---|---|---|---|---|
| Video Surveillance | Low_motion Video | Natural | 3- 6 Mbps | 300 ms | 25- 50 fps, FULL | MP2MP | Fast frame access |
| Video telephony | Static Video | Natural | <500 Kbps | 200 ms | 10 fps, QCIF | P2P | Scalability |
| Telemedicine | Video Still_pictures | Hybrid Text | >5 Mbps | <1 sec | 50 fps, FULL | MP2MP | Scalability, Editing, . . . |
| Digital TV | High_motion Video | Natural, text, synthetic | <1 Mbps | <1 sec | 25 fps, FULL | P2MP | Record, fast frame access |
| Corporate TV | Natural Text Synthetic | Natural, text, synthetic | 2 Mbps | <1 sec | 50 fps, FULL | P2MP | Scalability |
| Video conference | Natural Text | Natural, text, synthetic | 512 Kbps | <1 sec | 25 fps, QCIF-CIF | MP2MP | Scalability | number greater than 1, the optimum "Spatial Video CODEC" for a same input signal I. In this new technique (hereafter referred to as "Dynamic Coding") for digital video coding, "Spatial Video CODEC" is understood as the combination of any transform of the input signal, followed by a quantization of the transform coefficients and a corresponding entropic coder.

Video Coding is an important issue in all application fields where digital video information has to be stored on a digital support or transmitted over digital networks. Several solutions have been proposed in the last 20 years and standardizations efforts have been undertaken to define a unified syntax.

Standard video coding schemes have a rigid structure. They take into account the context of specific, well-defined applications requiring video coding, and propose an optimized, albeit limited, solution. This explains the number of existing international recommendations that have been defined for specific applications. For example, the ITU-T H.261 standard is designed for tele-conferencing and video-telephony applications, MPEG-1 for storage on CD-ROM, MPEG-2 for wideband TV broadcast, MPEG-4 for low-bitrate coding with multimedia functionalities and H264 for very low bit-rate video coding.

The strategy adopted by classical video coding schemes is prompted by the fact that no a single universal coding technique can be applied with optimum results in every context. In fact, the performance of a "Spatial Video CODEC" depends on several application specific parameters, such as: the type of the data to be compressed (still pictures, video, stereo imagery, and so on), the nature of the visual data (natural, synthetic, text, medical, graphics, hybrid), the target bitrate, the maximum acceptable delay (ranging from few milliseconds Given the wide variations in the requirements from application to application, it is clear that a coding scheme tuned for a specific application will be superior, for that application, to an universal coding technique that attempts to find a suitable compromise among different constraints. However, even the optimum "Spatial Video Video CODEC" for a specific set of constraints may be a sub-optimal solution when the parameters of the application are allowed to change through time. For example, in several multimedia scenarios, the video input combines static scenes to highly dynamic ones. Moreover, the sequences may be natural images, or synthetic scenes or combination of the two (text, graphs, and natural images) with a consequent variation of the statistical properties of the input signal.

SUMMARY OF THE INVENTION

The present invention proposes a method which is a suitable solution to achieve an optimum video coding despite the changes of the above discussed properties of the input signal.

The new proposed paradigm to Video coding is based on the following idea: dynamically evaluate the performances of several coders given the input data and the external constraints of the application. This evaluation is performed on a block-based basis. The input image can be organized as a set of rectangular blocks whose size can range from 2 by 2 pixels to the size of the input image. The results of such an evaluation are used to select the best performing among the available "Spatial Video CODECs" for that given input data. A prototype implementing this strategy has proved its superiority against standard approaches.

BRIEF DESCRIPTION OF THE DRAWINGS

The invention will now be disclosed with the help of the accompanying drawings.

FIG. 3 shows how the proposed "Dynamic Coding" fits in a standard video coding scheme, FIG. 4 shows the scheme of the Dynamic Coding base block, FIG. 7 shows a standard procedure to compute the Rate and the Distortion of the "Spatial Video CODEC", FIG. 8 shows a proposed Rate Distortion prediction scheme, FIG. 9 shows a performance comparison of three "Spatial Video CODECs" on a frame basis, FIG. 10 shows the frequency of the selection of a "Spatial Video CODEC" during the encoding of a 10 minutes typical TV sequence.

DETAILED DESCRIPTION

Figure 1:
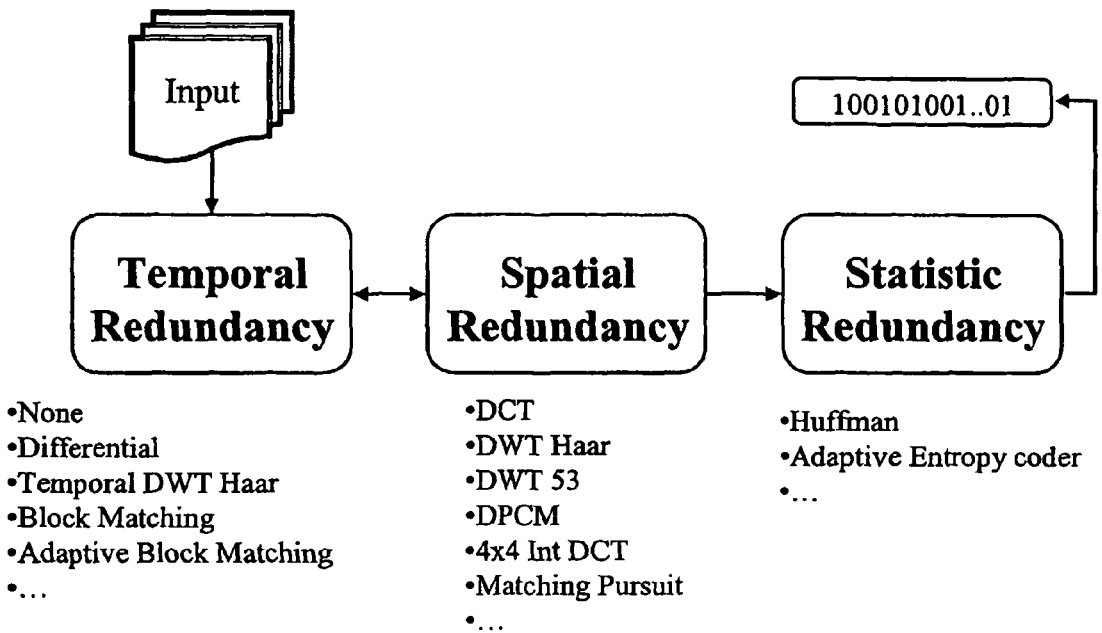
FIG. 1 shows the general structure of any video coding scheme.

In order to efficiently encode any digital signal it is important to exploit all the redundancies that the signal contains. When the input signal is a video signal there are three different kind of redundancies that can be exploited: the spatial, the temporal and the statistical redundancy. All existing video coding schemes apply different techniques to exploit more or less all these redundancies. Based on these observations the general scheme of any video coding is represented in FIG. 1. Each of the three main modules can be performed differently. As already discussed, the overall performances of any "Spatial Video CODEC" depends on the nature of the input signal, on the constraints of the application and clearly on the combination of the right tools for each of the three modules represented in FIG. 1.

Because of practical constraints, it is not possible to imagine that all the possible solutions can be evaluated. Thus the approach adopted by the standards is to fix one combination that provides the best compromise in some specific scenario. This constraints the efficiency of the "Spatial Video CODEC", but simplifies its implementation. What is lacking in order to dynamically adapt the scheme to the external constraints is an efficient prediction of the performances of each tool.

We will explain how it is possible to evaluate several tools to dynamically select the one that exploits optimally the spatial redundancy of the signal, by taking into account the properties of the previous tool used to exploit the temporal redundancy and the following tool used to exploit the statistic redundancy. This evaluation is fast and efficient and boosts the coding performances of standard approaches.

Hereafter, we refer to both the spatial and entropic redundancy modules as "Spatial Video CODEC". In this document, as previously mentioned, "Spatial Video CODEC" is understood as the combination of any transform of the input signal, followed by a quantization of the transform coefficients and a corresponding entropic coder.

Figure 2:
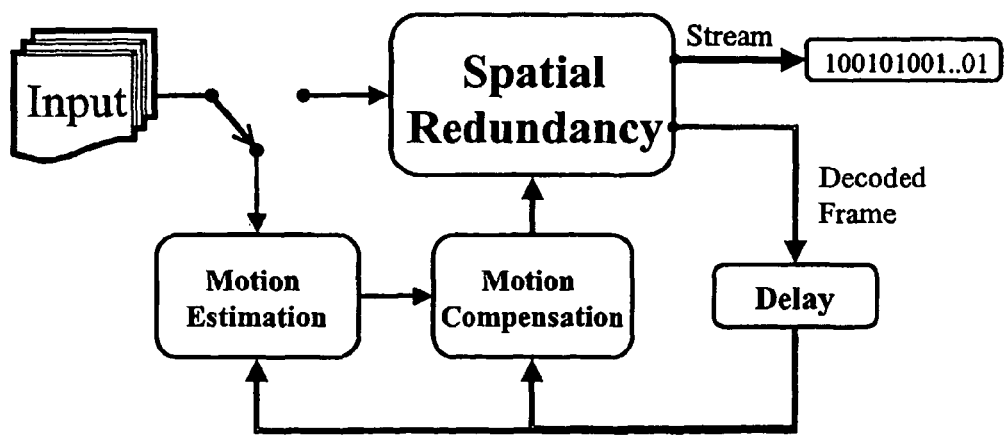
FIG. 2 shows MPEG-like simplified video coding scheme.

A simplified version of MPEG-like standard video encoder is shown in FIG. 2, where the Temporal redundancy is exploited with a block-matching approach (motion estimation and motion compensation), the spatial redundancy is exploited by DCT. Standard video coding schemes use the block based DCT transform in order to exploit the spatial redundancy present in the signal. The input signal is a natural image or a difference of two natural images. The input is divided into square blocks and each block is DCT transformed. The resulted coefficients are quantized to increase their redundancy. These quantized coefficients are encoded with a statistical coder and the results represent the output bitstream. By dequantizing (scaling back) the quantized coefficients and by applying the inverse s DCT transform, the decoded frame is obtained. This is stored and it is used as reference to predict the following frames of the input sequence. This scheme is controlled by a so called "rate-distortion" algorithm. This is a mechanism that controls the rate and/or the distortion of the video coding process. In particular it is possible to define an approximate rate and the "Spatial Video CODEC" will adapt the quantization step so as to provide the minimum distortion for the given rate. Note that the distortion may vary through time according to the complexity of the input scene and the performances of the "Spatial Video CODEC". However, the rate of the compressed sequence will remain approximately constant which is useful to stream video content over a band-limited network. When a live or single pass encoding is necessary, the "rate-distortion" algorithm must control the "Spatial Video CODEC" through a feedback loop. The results of the previous encoded frames is used to predict the difficulty of encoding the following frame. Given this prediction, the "rate-distortion" algorithm fixes the quantization step so as to approximate the requested rate. The rate distortion algorithm may also fix the distortion (or the quality) of the encoded video while the rate is free to vary along time. In this case, a fixed quantization associated to the requested distortion is usually defined and let unchanged along the sequence. Clearly, combination of the two objectives is also possible.

The technique proposed in this document can be applied in the same context as the one described above. The scheme is the same as the one in FIG. 2, except for the spatial redundancy module that is now substituted by the "Dynamic Coding" module as depicted in FIG. 3. The input frame can be a natural image: Intra frame (I frame); or the difference between two (or more) natural images: predicted frame (P or B frame). The dynamic coding scheme can be applied either on the whole input, or independently on any rectangular sub-block of the frame. The size of any sub-block may vary from 2×2 pixels to the size of the frame itself. The subblocks are non overlapping but they are all together covering the whole frame.

In order to optimally exploit the spatial redundancies, it is possible to evaluate not only one single transform (as the DCT in the standard approaches) associated to a unique quantization and entropic coder, but an arbitrary number of other "Spatial Video CODECs" composed of any possible transform with corresponding quantization and entropic coder. As in a standard approach, a rate-distortion algorithm is used to provide to the Dynamic Coding block an indication on the expected distortion and rate. In our implementation, this indication comes in the form of a quality parameter Q that defines the quality of the encoded frames. When fixing the quality parameter Q, the rate will vary according to the statistical properties of the input signal, otherwise, it is possible to chose the right Q in order to provide a constant bitrate coded video stream.

The basic "Dynamic Coding" block is illustrated in FIG. 4. Where the input can be either an I frame or a P/B frame, or any rectangular sub-block of the I or P/B frame. In FIG. 4, each $SC_n$ block represents a different "Spatial Video CODEC".

Given the input and the quality parameter Q, each $SC_n$ block outputs a bit-stream and two values: the rate $R_n$ and the distortion $D_n$ associated with it. So, in this scheme N "Spatial Video CODECs" ($SC_n$) are evaluated. Each $SC_n$ given its input and the quality parameter Q, returns a bitstream $B_n$ and the corresponding distortion $D_n$ and rate $R_n$. According to these two values a decision is made on which $SC_n$ has the best performance and it will be selected to actually encode the input.

In this document we propose a new procedure that is able to efficiently compare the performances of different "Spatial Video CODECs" in two steps: Normalization and Evaluation. The normalization step is performed offline, while the evaluation step is performed on the output of each $SC_n$. In the normalization step, all the "Spatial Video CODECs" that are to be evaluated are aligned in terms of the quality parameter Q. In the evaluation step, the rate-distortion performances of each normalized "Spatial Video CODEC" are predicted and the one with the best rate-distortion ratio is selected. The exact normalization and evaluation procedure are detailed hereafter.

The normalization step requires the definition of a quality parameter Q. The parameter Q must have a minimum value and a maximum value. In the preferred implementation, Q is any integer from 0 to 100. Q is the result of a rate-distortion algorithm that controls the encoding process to obtain one of the following:

1) a constant quality compression (in this case the distortion introduced by the coding process remains constant while the rate may vary along the sequence).

2) a constant rate compression (in this case, the rate of the encoded sequence remains constant while the quality/distortion may vary along the sequence).

All the "Spatial Video CODECs" are normalized or "aligned" as a function of the same parameter Q (quality) so as to provide the same distortion for the same value of Q. i.e. for the same input and the same Q parameter, all normalized "Spatial Video CODECs" should provide a compressed frame with similar distortion, but possibly differing rate.

In the proposed implementation, the "Spatial Video CODECs" are aligned according to the MSE (Mean Square Error) distortion measure. The alignment is performed by defining the following relationship between Q and the MSE distortion measure:

$$MSE = \frac{f(Q)^2}{12}, \quad (1)$$

where $f(Q)$ is a function of the quality parameter Q. As described by Mallat in "Analysis of Low Bit Rate Image Transform Coding" (In IEEE Transactions on Signal Processing, VOL. 46, No. 4, April 1998), for Spatial CODECs using a uniform quantization, the relationship between the quality parameter Q and the quantization step $\Delta$ can be expressed as: $f(Q)=\Delta$. In case of non-uniform quantization the relationship between MSE and Q has to be respected for each Q.

In a preferred implementation, in order to perform the normalization, the "Spatial Video CODECs" are uniformly quantized with a step $\Delta$ defined as:

$$\Delta = 2^{(C_1 - Q/C_2)}. \quad (2)$$

By combining equation (1) and (2) we obtain that the distortion expressed as the MSE is function of Q defined by:

$$MSE = \frac{\Delta^2}{12} = f'(Q) = \frac{(2^{(C_1 - Q/C_2)})^2}{12} \quad (3)$$

where $C_1$ controls the minimal and maximal quality and $C_2$ the variation of the distortion according to Q. In particular the following values have been chosen: $C_1=5$ and $C_2=24$. This means that the distortion is doubled for each decrease of 24 of the Q parameter.

Figure 5:
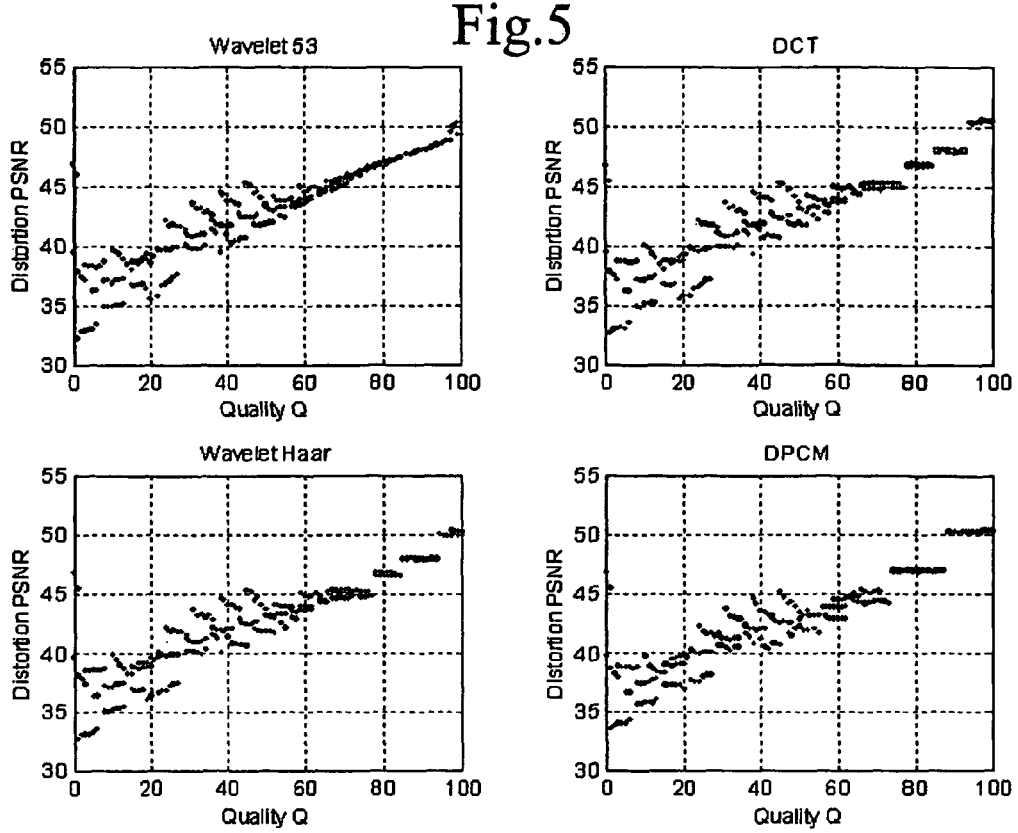
FIG. 5 shows examples of four different Normalized "Spatial Video CODECs"

The proposed normalization procedure is not exact, but as we show in FIG. 5, it is possible to obtain on different input signals a similar distortion for a given quality parameter Q and this for different "Spatial Video CODECs". Four transforms are displayed: the Wavelet 53, Wavelet Haar, DCT and DPCM. According to a given Q parameter, they introduce a similar distortion.

Moreover we claim that the error $E_n$ in the alignment of the n-th "Spatial Video CODEC" is small compared to the predicted distortion:

$$D_n = f'(Q) + E_n, \quad |E_n| << |D_n| \quad (4)$$

Figure 6:
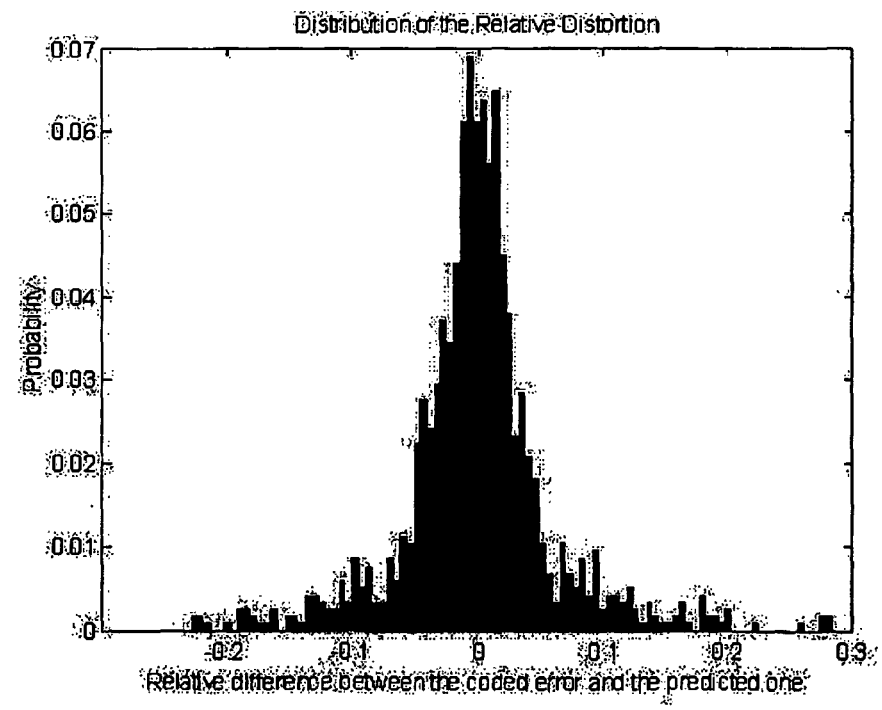
FIG. 6 shows a statistical evaluation of the "Spatial Video CODEC" alignment error.

We have statistically evaluated equation (4) and the performances of the proposed "Spatial Video CODEC" alignment and we report the results in FIG. 6. Below the computed and predicted distortions are compared with the following relative measure:

$$E_n = \frac{D_n - MSE}{MSE} \quad (5)$$

where the real distortion measure is $D_n$ and the predicted distortion measure is MSE. It turns out that most (>98% of the evaluated tests) of the predicted distortions introduce an approximation below 20% of the exact distortion.

The evaluation step requires the computation of the rate R and of the distortion D for each Normalized "Spatial Video CODEC" given a selected quality parameter Q and the current input block to be coded.

According to these values a decision is made on which "Spatial Video CODEC" has the best rate-distortion performance. This decision may be taken independently on the rate or on the distortion values. In the first case, the "Spatial Video CODEC" with minimum rate will be selected in the second, the "Spatial Video CODEC" with the minimum distortion will be selected. However, a better decision is obtained if both the rate and the distortion are taken into account. This is possible by applying a Lagrangian optimization of the two values:

$$L_n = R_n + \lambda D_n, \quad (6)$$

with n [2, N] representing the index of an evaluated "Spatial Video CODEC" over the N total number of "Spatial Video CODECs" and $\lambda$ representing the Lagrangian multiplier that provides the relative weight between rate and distortion in selecting the best compromise. In this context, the selection of the best "Spatial Video CODEC" is done by choosing the one with the minimum $L_n$.

In order to perform a Lagrangian optimization, it is necessary to compute the rate, the distortion and the optimal $\lambda$ for each "Spatial Video CODEC". In the following we describe the procedure adopted in this invention.

The Lagrange multiplier is responsible for weighting the contribution of the rate and of the distortion in the overall evaluation of the performances of a "Spatial Video CODEC". Its value should be computed according to the rate-distortion curves of each "Spatial Video CODEC" as a function of a given input. This is clearly too computationally expensive to be considered in a practical application. In our approach we find an approximation for $\lambda$ that is a function of the quality parameter Q. The starting point is the model of high rate proposed by Mallat. This model states that:

$$D = k \cdot 2^{-2R}, \tag{7}$$

where k is a constant depending on the "Spatial Video CODEC" and the input signal. From equation (7) we defines the relationship between rate and distortion as:

$$R = -\frac{\log_2\left(\frac{D}{k}\right)}{2}. \tag{8}$$

Merging (8) and (6) we obtain:

$$L = -\frac{\log_2\left(\frac{D}{k}\right)}{2} + \lambda D, \tag{9}$$

We can now minimize L as a function of the only distortion D. To do this, we differentiate over D and we find the roots:

$$\frac{dL}{dD} = -\frac{1}{D \cdot 2 \cdot \ln(2)} + \lambda = 0 \tag{10}$$

The final solution is:

$$\lambda = \frac{1}{2 \cdot \ln(2) \cdot D} \tag{11}$$

If the model of distortion of equation (3) is assumed valid, equation (11) may be written as:

$$\lambda = \frac{6 \cdot (2^{(Q/C_2 - C_1)})^2}{\ln(2)} \tag{12}$$

Equation (12) defines the optimum $\lambda$ as a function of the quality parameter Q. By referring to the scheme of FIG. 4, the single parameter Q controls both the encoding performances of each "Spatial Video CODEC" and the Lagrange multiplier $\lambda$. This is the strong interest and novelties of this approach: given Q, it is possible to measure R and D for each Normalized "Spatial Video CODEC" and at the same time to compute the corresponding $\lambda$. The selected Normalized "Spatial Video CODEC" is the one that minimize L in equation (6).

Given the parameter Q, and the input I, computing R and D can be performed in an precise, but computationally expensive way by applying the "Spatial Video CODEC" to the input and measuring the size of the encoded stream and the introduced distortions. This procedure is summarized in FIG. 7. Note that this procedure introduces a significant amount of computations that increase with the number N of evaluated "Spatial Video CODECs". In fact, in order to evaluate the distortion of a single "Spatial Video CODEC" it is necessary to scale back the quantized coefficients, to perform the inverse transform and to compute the distortion compared to the input. The rate is obtained first by performing the Entropic Coding of the quantized coefficients and then by counting the resulting bits.

In the preferred implementation, an approximate prediction of both R and D is obtained without the need of performing the Quantization, the Entropic Coder, the Scaling and the Inverse Transform steps. The prediction can be computed in a much more computationally efficient way and the introduced approximation does not affect the correct choice of the best "Spatial Video CODEC".

In the preferred implementation, the rate is estimated as a linear function of the number of zeros obtained after quantization of the coefficients while the distortion is approximated from the distribution of the transformed coefficients. In particular, before quantization, the histogram of the transform coefficient is computed. The rate is predicted as a function of the quantization step $\Delta$:

$$R = \alpha \sum_{x_i = 0}^{|x_i| < \Delta} N_{x_i} \tag{12}$$

where $N_{xi}$ is the number of coefficient with an amplitude equal to $x_i$ and the parameter $\alpha$ is derived from experimental results. Note that in a preferred implementation $\Delta$ is related to Q by equation (2), thus the rate is a simple function of the quality parameter Q defined by the rate-distortion algorithm.

The distortion is predicted from the distribution of the transformed coefficients:

$$D = \sum_{x_i = 0}^{|x_i| < \Delta} x_i^2 N_{x_i} + \frac{\Delta^2}{12} \sum_{|x_i| \geq \Delta} N_{x_i}, \tag{13}$$

where $x_i$ is the amplitude of the coefficients and $N_{xi}$ is the number of coefficient with an amplitude of $x_i$. Note that in a preferred implementation $\Delta$ is related to Q by equation (2), thus the distortion is also a simple function of the quality parameter Q defined by the rate-distortion algorithm.

The proposed procedure to estimate the rate and the distortion of the "Spatial Video CODECs" is displayed in FIG. 8. Note that in this scheme the displayed block does not provide the final bitstream $B_n$, but only the transform coefficients. To obtain the final bitstream it is necessary to perform a quantization of the coefficients followed by an entropic coding. The possibility of predicting the rate and the distortion without performing the quantization and the entropic coding is an important advantage from a computational point of view. In fact, these two steps and in particular the netropic coder are computational expensive. In our implementation all the "Spatial Video CODECs" are evaluated, but only the one selected requires the execution of the quantization and of the entropic coding. Compared to FIG. 7, now only the transform is necessary to estimate the distortion and the rate of a Spatial transform. Note that when the best "Spatial Video CODEC" is selected, it will be necessary to quantize the transform coefficients and to apply the corresponding entropic coder.

In order to illustrate the principle of the dynamic coder, two examples of measure of the performance will be presented.

Both example have been computed using a frame based dynamic coder. The first example shown in FIG. 9 presents the individual performance of three types of "Spatial Video CODEC". The first one is a wavelet based CODEC, well adapted for natural scene, the second one is a wavelet based CODEC well adapted to discontinuities, and the last one is a block based CODEC well adapted to code local information. Depending of the characteristic of the scene one "Spatial Video CODEC" outperforms the others. However, it can be seen that the optimal "Spatial Video CODEC" between frames 450 and 500 becomes sub optimal in the following frames. The dynamic coder will always choose the best "Spatial Video CODEC" in terms of MSE, providing an optimum overall performances.

The next example (FIG. 10) shows in which proportion each "Spatial Video CODEC" scheme was chosen in order to compress a typical TV sequence of approximately 10 minutes at 1000 kbits per second. Again we confirm that there is not a single "Spatial Video CODEC" that significantly out-performs all other "Spatial Video CODECs."

The proposed dynamic coder offers several advantages over standard approaches:
1) It guarantees the choice of an optimal encoding with high granularity: each block 2×2 can be encoded with a different "Spatial Video CODEC".
2) Its complexity is limited thanks to the prediction of the rate and the distortion from the transform coefficients.
3) It is an open architecture: it extend the standard approaches to an unlimited number of "Spatial Video CODECs".
4) It offers a high degree of adaptation: the best "Spatial Video CODEC" is automatically selected according to the input and the target rate.
5) According to the application the complexity may be reduced simply by reducing the number of "Spatial Video CODECs" to be evaluated. This reduction or increase could be performed at run-time.
6) It allows to introduce application specific "Spatial Video CODECs" without loosing the generality of standard approaches.

The dynamic codec is particularly suitable for all those application where high quality video signals have to be encoded in real-time at low-bit rates (<500 Kbps) for interactive TV, Corporate TV, TV over ADSL, TV broadcast. In particular for all those input signals characterized by the presence of natural, synthetic and mixed scenes.

The invention claimed is:

1. A method of selecting, from among N Spatial Video CODECs where N is an integer number greater than 1, the optimum Spatial Video CODEC for a same input signal I, comprising the following steps:
   obtaining from all the N Spatial Video CODECS, for the same input signal I and a same quality parameter Q, a rate R and distortion measures D, Q being an integer value between 0 and 100, defined by any rate-distortion algorithm to provide a compression of the input sequence with constant rate or with constant distortion, and
   calculating an optimality criterion by using the value $L_n = f(R_n, D_n)$ calculated for all the n from 1 to N, n being the index of the Spatial Video CODEC, where $f(R_n, D_n)$ is a function of $R_n$ and $D_n$,
   wherein the Spatial Video CODECs are aligned according to a theoretical MSE and the quality parameter Q, MSE being the Mean Square Error and computed as $$MSE = \frac{\Delta^2}{12} = \frac{(2^{(C_1 - Q/C_2)})^2}{12}$$

for the case of uniform quantization with an average step $\Delta$ defined as $\Delta = 2^{(C_1 - Q/C_2)}$ where $C_1$ controls the minimal and maximal quality and $C_2$ the variation of the distortion according to quality parameter Q,
   wherein the optimally criterion is defined as the minimization of said value $L_n = f(R_n, D_n)$,
   wherein said function is defined as the Lagrange optimization $f(R_n, D_n) = R_n + \lambda D_n$,
   and wherein the Lagrange multiplier that weighs the relative influence of the rate R and of the distortion D is defined as $$\lambda = \frac{1}{2 \cdot \ln(2) \cdot MSE}.$$

2. The method according to claim 1, wherein the input signal I is a natural image or a predicted image or any rectangular sub-block from a minimum size of 2×2 of the natural image or of the predicted image.

3. The method according to claim 1, wherein the rate R of the n-th Spatial Video CODEC is approximated by $$R = \alpha \left( N_T - \sum_{x_i=0}^{|x_i|<\Delta} N_{x_i} \right),$$

where $N_{x_i}$ is
   the number of coefficients with an amplitude equal to $x_i$, $N_T$ is the total number of coefficients, and the parameter $\alpha$ is derived from experimental results.

4. The method according to claim 1, wherein the distortion D of the n-th Spatial Video CODEC is approximated by $$D = \sum_{x_i=0}^{|x_i|<\Delta} x_i^2 N_{x_i} + \frac{\Delta^2}{12} \sum_{|x_i| \geq \Delta} N_{x_i}$$

where $x_i$ is the amplitude of the coefficients and $N_{x_i}$ is the number of coefficients with an amplitude of $x_i$.

5. The method according to claim 2, wherein the rate R of the n-th Spatial Video CODEC is approximated by $$R = \alpha \left( N_T - \sum_{x_i=0}^{|x_i|<\Delta} N_{x_i} \right),$$

where $N_{x_i}$ is the number of coefficients with an amplitude equal to $X_i$, $N_T$ is the total number of coefficients, and the parameter $\alpha$ is derived from experimental results.

6. The method according to claim 2, wherein the distortion D of the n-th Spatial Video CODEC is approximated by $$D = \sum_{x_i=0}^{|x_i|<\Delta} x_i^2 N_{x_i} + \frac{\Delta^2}{12} \sum_{|x_i|\geq\Delta} N_{x_i}$$

where $x_i$ is the amplitude of the coefficients and $N_{x_i}$ is the number of coefficients with an amplitude of $x_i$.

7. The method according to claim 3, wherein the distortion D of the n-th Spatial Video CODEC is approximated by $$D = \sum_{x_i=0}^{|x_i|<\Delta} x_i^2 N_{x_i} + \frac{\Delta^2}{12} \sum_{|x_i|\geq\Delta} N_{x_i}$$

where $x_i$ is the amplitude of the coefficients and $N_{x_i}$ is the number of coefficients with an amplitude of $x_i$.

* * * * *